(No Model.)
H. C. GREEN.
AUTOMATIC FOUNTAIN COFFEE POT.
No. 411,656. Patented Sept. 24, 1889.
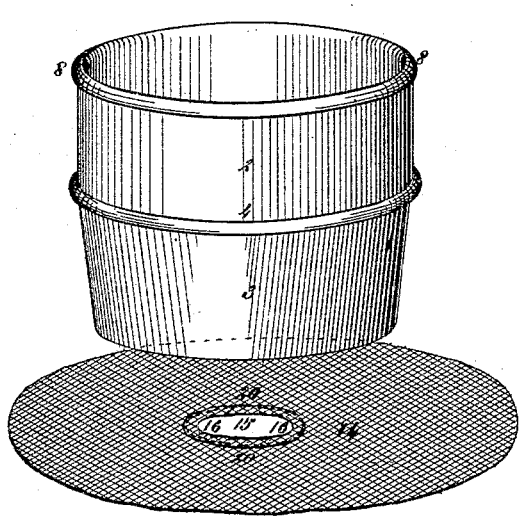
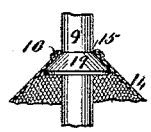
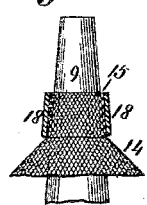
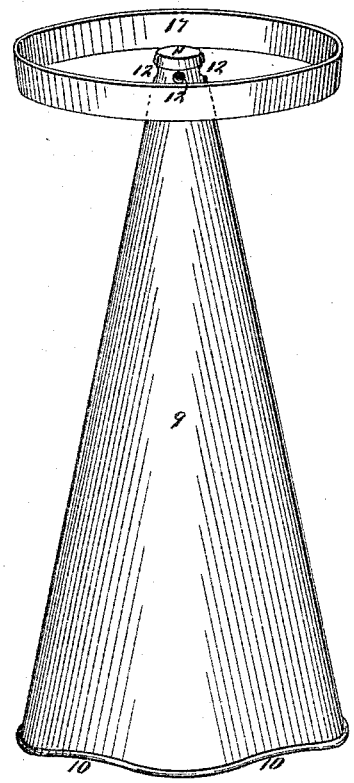
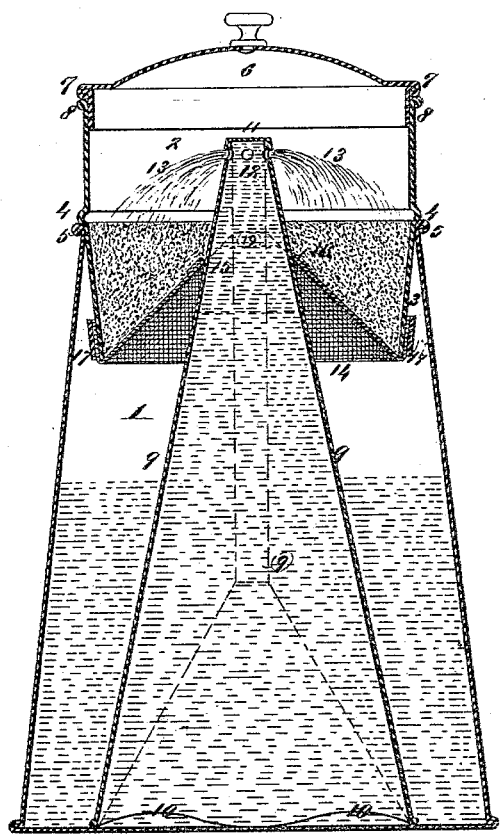
Attest:
Charles Pickler
E. Arthur
Inventor:
Henry C. Green.
By Knight Bro's
atty's.

UNITED STATES PATENT OFFICE.

HENRY C. GREEN, OF ST. LOUIS, MISSOURI.

AUTOMATIC FOUNTAIN COFFEE-POT.

SPECIFICATION forming part of Letters Patent No. 411,656, dated September 24, 1889.

Application filed February 1, 1889. Serial No. 298,349. (No model.)

*To all whom it may concern:*

Be it known that I, HENRY C. GREEN, of the city of St. Louis, in the State of Missouri, have invented a certain new and useful Improvement in Automatic Fountain Coffee-Pots, of which the following is a full, clear, and exact description, reference being had to the accompanying drawings, forming part of this specification.

This invention relates to a coffee-pot with an automatic fountain, a perforated strainer that is seated on the fountain-tube, a strainer-cup, and stay-rings that secure the strainer respectively to the cup and tube.

Figure I is a perspective view of the fountain-tube, the strainer-cup, the strainer with its central perforation, and the stay-ring that secures the strainer to the strainer-cup. Fig. II is a vertical section of the coffee-pot and its interior arrangements, showing the automatic fountain, the strainer-cup, the strainer, its perforated center fitting around the fountain-tube, and the stay-ring that secures said strainer to said tube. It also shows in broken lines a modification of the fountain-tube, in which a funnel-shaped tube is shown in broken lines as the equivalent of the conical tube. Fig. III is a detail of the fountain-tube, and shows the conical collar around said tube and the strainer, whose perforated center fits around said tube and on said collar; and Fig. IV is a detail of the fountain-tube, the strainer, and the stay-ring that secures the strainer to said tube.

Referring to the drawings, 1 represents the base or main body of the coffee-pot.

2 is the strainer-cup, whose reduced bevel end 3 fits down within the base-section 1 until the peripheral corrugated head 4 on the cup rests on the flanged rim 5 that surmounts the top of said base-section.

6 is the flanged cover, of usual construction, that fits on and in the strainer-cup, its peripheral rim 7 resting on the surmounting rim 8 of said cup.

9 represents the automatic fountain-tube, which may be made conical, as shown in full lines in Figs. I and II, or funnel-shaped, as shown in broken lines in Fig. II, the cone and funnel being equivalents of each other, having an expansive base surmounted by a contracted elevated tubular discharge, whether the line of contraction be in a straight line, as in the cone, or with an intermediate waist, as in the funnel form of the device. The fountain-tube sits in the middle of the coffee-pot, its expanded base sitting on the bottom of said pot. The said base is constructed with a curvilinear or undulating outline 10 around its bottom, which allows the free passage of the liquid in its continuous automatic fountain-circuit, caused by the expansion of the air in the water by the boiling process that produces the well-known ebullition that elevates the water and discharges it at the fountain-jets. The top of the fountain-tube is surmounted by a cap 11, and the tube immediately beneath said cap is provided with a series of perforations 12, through which the fountain-jets 13 are discharged.

14 represents the strainer-cloth, which may be made of any suitable loose woven, but preferably fine, fabric, which will readily allow the passage of the infused liquid. The center of said strainer is provided with an opening 15, around the periphery of which the inner edge of the cloth is turned, being loosely folded to form a re-enforcing seam 16, which allows of the free expansion and contraction of said seam when it is seated around the fountain-tube. The said re-enforcing seam around the periphery of the central opening of the strainer is stitched down by a loose herring-bone diagonal stitch 20, that forms an elastic stitch, which freely gives and takes to accommodate itself to the peripheral diameter of the fountain-tube on which it is seated, and yet so closely to embrace the same as to prevent the passage of sediment between it and said tube.

17 represents a stay-ring that, when the strainer is placed on the lower edge of the bevel end 3 of the strainer-cup, is passed over the same to retain it to its seat, and 18 is a stay-ring of smaller diameter for securing the center of the strainer to the outer periphery of the fountain-tube.

19 is a conical flaring collar that may be secured around near the top of the fountain-tube when said tube is not of a sufficiently-conical form to prevent the strainer from sliding down, and in such cases, as it may be preferred, to dispense with the smaller stay-ring 18 that holds the strainer to the tube.

The setting up and operation of the device are as follows:

The strainer-cup 2 may be inverted on the table or placed in any convenient position, and the strainer-cloth 14 is then placed on its reduced bevel end, care being taken that the perforate opening 15 shall occupy a central position in the middle of the cup and the cloth be left loose and baggy. The stay-ring 17 is then seated around the strainer cloth and cup, as shown in its operative position in Fig. II. The fountain-tube is inserted in the coffee-pot, (into which a sufficient quantity of boiling water has been poured from the kettle, say to the height indicated in Fig. II,) its corrugated base resting on the inside of the bottom of said coffee-pot. The strainer-cup 2, with the strainer-cloth secured thereto, as stated, by the stay-ring 17, is then inserted in its place in the top of the coffee-pot, the reduced bevel end of the strainer-cup entering within the base-section of the coffee-pot until its peripheral corrugated rim 4 rests on the surmounting rim 5 of said lower section, and the opening 15 in the center of the strainer is made to embrace around the fountain-tube. The chain or herring-bone stitch to the seam around the periphery of said opening constitutes an elastic seam that to a certain extent accommodates itself to the diameter of the tube that it embraces and provides a clinging-tension to the same. I also provide, as stated, a smaller stay-ring 18 than the one that fastens the strainer-cloth to the cup, and said ring 18 is used to secure the center of the strainer-cloth to the fountain-tube when the tension of the peripheral seam around the opening is not otherwise sufficient. The supplemental collar 19 is placed around the fountain-tube when it is desired to make a more flaring conical seat for the inner portion of the strainer to rest on.

A drawing of coffee or of tea, as the case may be, is placed within the strainer, the lid is closed down, and the coffee-pot is placed on the stove, the heat of which (if there be sufficient fire in the stove) will immediately commence to operate the fountain. The boiling water ascends through the cone or funnel shaped tube until it reaches the summit, from which peripheral fountain-jets 13 of boiling water descend on the coffee or tea, as the case may be, in the strainer, through which it strains, and the infusion re-enters under the corrugated base of the fountain-tube, again ascends, and is again discharged by the fountain-jets to extract additional strength from the contents of the strainer, and thus *ad infinitum* as long as it is desired to extract more strength from the material, as the water ascends within the fountain-tube by the boiling process or ebullition of the water, as stated.

If the infusion is of coffee, the pot should be removed from the stove long enough for any sediment there may be therein to settle; but, although it is preferred to settle the coffee, as is usual with other processes, yet, if the strainer-cloth is sufficiently fine, there will by this process be found to be very little sediment in the infusion to settle.

I claim as my invention—

1. In a coffee-pot, the combination of the base-section, the strainer-cup 2, having a reduced beveled lower end that fits within the base-section, and a surmounting fountain-chamber above the irremovable base-section of the coffee-pot, the fountain-tube having an undulating expanded base that allows the free passage of the liquid, the surmounting cap 11, the said tube being provided with perforations 12, through which the fountain-jet discharges, and the strainer-cloth 14, secured to the bottom of the strainer-cup, and also secured at a higher level to the conical tubular collar 9, so as to stretch said strainer-cloth at a sharp inclination to re-enforce it from sagging, substantially as described, and for the purpose set forth.

2. In a coffee-pot, the combination of the base-section 1, the fountain-tube 2, having an expanded base with an undulating bottom and provided with perforations near the top for the fountain-jets, the strainer-cup, the bevel base strainer-section of which fits within the base-section of the coffee-pot, the projecting bead-flange 4 on the periphery of said strainer-cup, that rests on the surmounting projecting ring 5 of said base-section, the strainer-cloth provided with a central opening 15, the elastic seam around the periphery of said opening, the said opening fitting around and embracing the fountain-tube, the stay-ring 17, that secures the strainer-cloth to the cup 2 at a lower level than the attachment of said strainer where it embraces the conical fountain-tube to hold said strainer-cloth at a sharp inclination to re-enforce it from sagging, and the stay-ring 18, that secures the center of the strainer to the fountain-tube, substantially as described, and for the purpose set forth.

3. In a coffee-pot, the combination of the base-section, the fountain-tube having an expanded base with a corrugated or undulating bottom and provided with perforations near the top for the fountain-jets, the flaring strainer center bearer-collar 19 around the fountain-tube, the strainer-cup 2, the strainer-cloth 14, provided with the center opening 15, the elastic seam around said opening, the stay-ring 17, that secures the strainer-cloth to the cup, and the stay-ring 18, that secures the center of the strainer to the fountain-tube at a higher level than at its peripheral attachment to the cup to hold said strainer-cloth at a sharp incline to re-enforce the same from sagging, substantially as described, and for the purpose set forth.

HENRY C. GREEN.

In presence of—
BENJN. A. KNIGHT,
SAML. KNIGHT.